United States Patent

Shaw et al.

[11] Patent Number: 5,529,138
[45] Date of Patent: *Jun. 25, 1996

[54] VEHICLE COLLISION AVOIDANCE SYSTEM

[76] Inventors: David C. H. Shaw; Judy Z. Z. Shaw, both of 3312 E. Mandeville Pl., Orange, Calif. 92667

[*] Notice: The term of this patent shall not extend beyond the expiration date ofPat. No. 5,314,037.

[21] Appl. No.: 147,312

[22] Filed: Nov. 5, 1993

Related U.S. Application Data

[63] Continuation-in-part of Ser. No. 8,367, Jan. 22, 1993, Pat. No. 5,314,037.

[51] Int. Cl.$^6$ .............................. B62D 1/24; B60T 7/16; B60K 28/00
[52] U.S. Cl. .................... 180/169; 180/197; 340/903; 342/59; 342/71; 342/109; 364/426.04
[58] Field of Search .................... 180/169, 197; 340/903; 342/59, 70, 71, 109; 364/426.01, 426.04, 424.05

[56] References Cited

U.S. PATENT DOCUMENTS

| | | | |
|---|---|---|---|
| 4,072,945 | 2/1978 | Katsumata et al. | 342/70 |
| 4,168,499 | 9/1979 | Matsumura et al. | 342/71 X |
| 4,403,220 | 9/1983 | Donovan | 342/59 X |
| 4,552,456 | 11/1985 | Endo | 342/70 X |
| 4,626,850 | 12/1986 | Chey | 340/903 |
| 5,103,925 | 4/1992 | Imaseki et al. | 364/424.05 X |
| 5,162,794 | 11/1992 | Seith | 340/903 |
| 5,165,497 | 11/1992 | Chi | 180/169 |
| 5,177,462 | 1/1993 | Kajiwara | 180/169 X |
| 5,189,619 | 2/1993 | Adachi et al. | 364/426.04 |
| 5,203,422 | 4/1993 | Estep et al. | 180/169 |
| 5,314,037 | 5/1994 | Shaw et al. | 180/169 |
| 5,332,057 | 7/1994 | Butsuen et al. | 180/169 |
| 5,339,075 | 8/1994 | Abst et al. | 180/169 X |
| 5,349,430 | 9/1994 | Yamamoto et al. | 180/169 X |
| 5,357,438 | 10/1994 | Davidian | 180/169 X |

*Primary Examiner*—Brian L. Johnson
*Attorney, Agent, or Firm*—Henderson & Sturm

[57] ABSTRACT

An automobile collision avoidance system based on laser radars is disclosed for aiding in avoidance of automobile collisions. The very small beam width, very small angular resolution and the highly directional character of laser radars provide a plurality of advantages as compared with microwave radars. With two sets of laser radars this system can detect the location, the direction of movement, the speed and the size of all obstacles specifically and precisely. This system includes laser radars with transmitters and receivers, a computer, a warning device and an optional automatic braking device. A steering wheel rotation sensor or a laser gyroscope is utilized to give information of system-equipped vehicle's directional change. The system will compare the predicted collision time with the minimal allowable time to determine the imminency of a collision, and when determined, provides a warning. An optional automatic braking device is disclosed to be used when the vehicle user fails to respond to a warning. Furthermore, a wheel skidding detecting system based on a discrepancy between the directional change rate predicted by a steering wheel rotation sensor and the actual directional change rate detected by a laser gyroscope is also disclosed. The detection of wheel skidding can be utilized by various vehicle control designs. An averaging device for a steering wheel and a vehicle tilting sensor are used to supplement the steering wheel rotation sensor to improve the accuracy of the automobile collision avoidance system and the wheel skidding detecting system.

47 Claims, 7 Drawing Sheets

VEHICLE COLLISION AVOIDANCE SYSTEM

This is a continuation-in-part patent application of previous application, Ser. No. 08/008,367, filed on Jan. 22, 1993; now U.S. Pat. No. 5,314,037, issued on May 24, 1994.

BACKGROUND ART OF THIS INVENTION

TECHNICAL FIELD

The present invention relates generally to collision avoidance system and wheel skidding detection system for roadway vehicles, and more particularly, to the use of laser radars and laser gyroscope in aiding in the avoidance of vehicle collisions and to the use of laser gyroscope in detection of wheel skidding of vehicles.

This invention was the subject matter of Document Disclosure Program Registration numbers 310281, 312808 and 313901 which were filed in the United States Patent and Trademark Office on May 22, 1992, Jul. 8, 1992 and Jul. 23, 1992 respectively.

The use of radars in collision avoidance systems is generally known. U.S. Pat. No. 4,403,220 dated Sep. 6, 1983 discloses a radar system adapted to detect relative headings between aircraft or ships at sea and a detected object moving relative to the ground. The system is adapted to collision avoidance application. U.S. Pat. No. 4,072,945 dated Feb. 7, 1978 discloses a radar-operated collision avoidance system for roadway vehicles. The system senses the vehicle speed relative to an object and its distance and decides whether the vehicle is approaching the object at a dangerously high speed. A minimum allowable distance represented by a digital code is stored in a memory of a computer and the minimum allowable distance is compared with the distance sensed by the radar. U.S. Pat. No. 4,626,850 dated Dec. 2, 1986 discloses a dual operational mode vehicle detection and collision avoidance apparatus using a single active or passive ultrasonic ranging device. The system is particularly adapted to scan the rear and the lateral sides of the motor vehicle to warn the vehicle user of any danger when changing lanes.

Most of the prior art collision avoidance systems use microwave radars as the ranging and detecting device. There are multiple disadvantages of these automobile collision avoidance systems when microwave radars are used. One major disadvantage is related to the beam width, that is the angular width of the main lobe of the radar, and the associated angular resolution of the microwave radar. The beam width is inversely proportional to the antenna diameter in wavelength. With the limitation of the antenna size, it is very difficult to make a reasonable size microwave radar with beam width less than 3 degrees. At the desired scanning distance, this beam width will scan an area which is much too big and thus is too nonspecific and difficult to differentiate the received echoes. Besides getting echo from another car in front of it, this radar will also receive echoes from roadside signs, trees or posts, or bridges overpassing an expressway. On highways with divided lanes the microwave radar will receive echoes from cars 2 or 3 lanes away and has difficulty to differentiate them from echoes coming from objects in the same lane. Because of the poor angular resolution of microwave radars, the direction of objects can not be specifically determined and objects too close to one another cannot be separated. The angular resolution of microwave radars is not small enough for them to be effectively used to monitor roadway traffic. The other disadvantage is that the microwave radars have difficulty in distinguishing radar signals coming from adjacent cars with similar equipment. If there are more than two cars with the same radar equipment on the same scene, the signals become very confusing.

The ultrasonic ranging and detecting device's angular resolution is also too poor to be effectively used in roadway traffic monitoring. The ultrasonic devices have even more difficulty than the microwave radars in determining the direction and location of echoes precisely, in the detection of directional change of objects and in avoiding signals coming from adjacent vehicles with similar equipment.

In the first, second and third preferred embodiments of this invention, laser radars are used in automobile collision avoidance system to avoid the above disadvantages of microwave radars or ultrasonic devices.

In the prior art, there is no accurate way to predict when a collision may happen when dealing with a mobile obstacle, especially when the obstacle is moving in a direction different from the direction of the system-equipped vehicle. It is very important to be able to precisely predict a collision in order to give a proper warning as soon as possible and, meanwhile to avoid unnecessary warnings. In the first, second and third embodiments of this invention, novel ways to more precisely predict collisions are disclosed.

In U.S. Pat. No. 4,072,945 dated Feb. 7, 1978 Katsumata et al uses minimum allowable distance as the basis for their collision avoidance system. However, the concept of minimum allowable distance fails to take into consideration many other factors which influence the collision timing. In this invention a novel concept of minimum allowable time is disclosed. Minimum allowable time can be easily adjusted by other factors, including road condition, visibility, driver's physical and mental condition and other factors.

Furthermore, in the prior art there is no reliable way to get information of system-equipped vehicle's directional change. In the third embodiment of this invention, a novel concept of utilizing a laser gyroscope to get very accurate information of directional change of the system-equipped vehicle is disclosed.

Wheel skidding is another important cause of vehicle collisions or accidents. The prior art is replete in roadway vehicles with four wheel steering capability with various designs to control the steering of rear wheels. It has been well known that steering the front wheels and rear wheels in the same direction, also called coincidence-phase direction, at a high vehicle speed can promote the stability of the vehicle and decrease the possible lateral skidding of wheels caused by the centrifugal force during turning. Adjusting the rear wheel steered angle is used to prevent or correct wheel skidding.

U.S. Pat. No. 5,103,925 dated Apr. 14, 1992 includes a rotational speed sensor for each wheel, wherein detection of difference in rotational speed between the front and rear wheels indicates presence of wheel skidding during turning. When wheel skidding is detected, a correction value is applied to modify the rear wheel steered angle. However, using the difference in rotating speed between the front wheels and the rear wheels as a basis for detecting wheel skidding will become inaccurate when wheel skidding occurs on wet roads or icy roads or when there is wheel locking due to excessive brake application. In the fourth embodiment of this invention a new and improved wheel skidding detecting system based on a laser gyroscope will be disclosed.

SUMMARY OF THE INVENTION

The present invention has been made to specifically address and improve the foregoing disadvantages and problems in the prior art. More particularly, in the present invention, laser radars are utilized as scanning and ranging devices. Laser radars have much smaller beam width and angular resolution and can give more specific and precise information of detected obstacle's direction, distance and relative speed. The data obtained by the laser radars are processed by a computer to obtain a predicted collision time.

This invention also utilize novel concepts of minimal allowable time. The minimal allowable time is dependent on multiple factors, including the vehicle's speed, obstacle's speed, steering wheel information, road condition, the light condition, the driver's condition and the obstacle's size. This invention includes various means to obtain data for all of these factors. This data is processed by the computer. The minimal allowable time is obtained by the computer either by specifically reading prestored memory matrices or by calculation with a multivariable function. The memory matrices or the multi-variable function are both based on the aforementioned multiple factors influencing the minimal allowable time. When the predicted collision time is shorter than the minimal allowable time, the computer will generate warning signals to be sent to an alarm system and an optional automatic braking device.

In the first preferred embodiment of this invention, a single set of laser radars is utilized to detect any obstacle within a narrow scanning zone. The scanning zone is generally a narrow band of area directly in front of a system-equipped vehicle. For example, the scanning zone for one of the designs is the area within two parallel lines extending from the lateral sides of the system-equipped vehicle.

The second preferred embodiment is a much more advanced version of this invention as compared with the first embodiment. In the second embodiment, two laser radar sets are utilized, one set being mounted near the right end of the front side of a vehicle, and the other set being mounted near the left end of the front side of the vehicle. Each laser radar set has a scanning zone of 180 degrees. Based upon the difference of the measured relative speed components in the radial directions of the right and the left laser radar sets respectively, the exact relative speed and the direction of movement of any obstacle can be determined. Thus the precise courses of movement of the vehicle and all adjacent obstacles can be predicted, whereupon very reliable predicted collision time can be calculated for all obstacles within the 180 degree or near 180 degree scanning zone.

A steering wheel rotation sensor is utilized in the second embodiment to give the computer information about the system-equipped vehicle's direction of movement. However, the information generated by a steering wheel rotation sensor will be inaccurate when there is any significant wheel skidding, road tilting or unbalanced braking of the tires. These factors can be corrected by a vehicle tilting sensor and a novel averaging device for a steering wheel. In the third embodiment, a laser gyroscope is utilized to detect the vehicle's directional change. The directional information based on the laser gyroscope is more reliable than that based on the steering wheel rotation sensor. The rest of the third embodiment is the same as the second embodiment.

In the fourth embodiment, a wheel skidding detecting system for a roadway vehicle based on a laser gyroscope and a steering wheel rotation sensor is disclosed. A vehicle tilting sensor and an averaging device for the steering wheel are used to supplement a steering wheel rotation sensor. Any significant discrepancy between a predicted directional change rate, as obtained by the steering wheel rotation sensor, and an actual directional change rate, as obtained by the laser gyroscope, indicates presence of wheel skidding. Various vehicle control designs can respond to wheel skidding signals to correct or alleviate the wheel skidding.

BRIEF DESCRIPTION OF THE DRAWINGS

These and other attributes of the invention will become more clear upon a thorough study of the following description of the preferred embodiments for carrying out the invention. Such description makes reference to the annexed drawings, wherein.

DETAIL DESCRIPTION OF THE PREFERRED EMBODIMENTS

Figure 1:
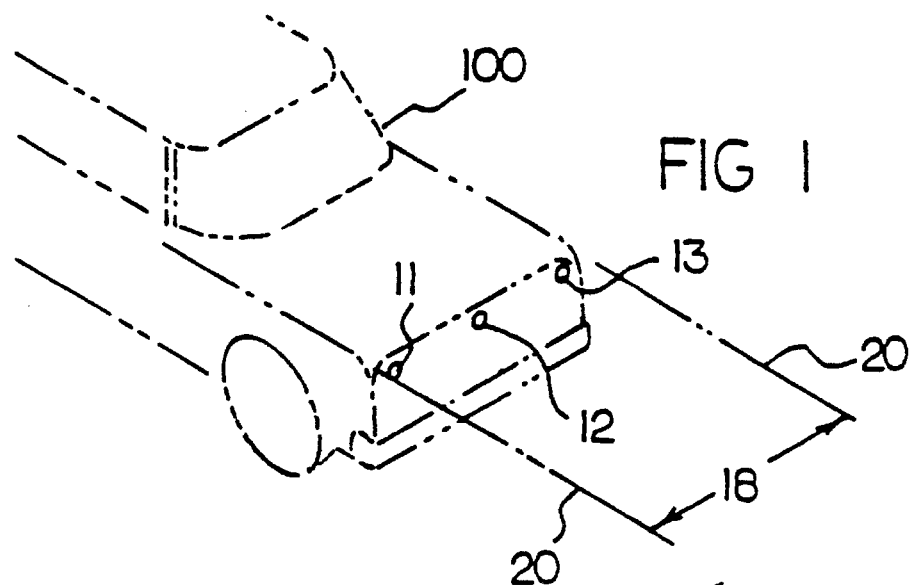
FIG. 1 is a view of an arrangement of the laser radar units in the first embodiment of this invention.

For a better understanding of the present invention and its operating advantages, laser radars and laser gyroscopes will be reviewed, followed by description of four preferred embodiments.

Review of Laser Radars

Radars have been used widely in detection of speed and distance of moving objects. Most radars use electromagnetic waves in the microwave frequency range. They are divided into pulse radars and continuous radars. In a pulse radar, the transmitter sends out radar signals through the antenna in pulses with extremely short duration, millionth of a second for example. The next pulse is emitted after the echoes have been received. The radars use doppler principle to calculate the speed by the amount of frequency shift. The doppler shift is caused by the targets moving toward or away from the radar in the radar's radial direction. Pulse radar can detect the speed and distance of a target. A simple continuous wave radar can give the speed information, but not the distance information. A frequency modulated continuous wave radar can detect both the speed and the distance.

The angular resolution of a radar depends on the beam width. If two targets are at about the same distance but at slightly different angles, they can be separated if they are more than one beam width apart. Ambiguity sometimes occurs due to reception of echoes from targets beyond the range of interest and of second-time-around echoes. This can be resolved by range gates which make radar insensitive to targets beyond the range of interest. The range ambiguity can also be resolved by filters that put limits on range.

Laser was invented in 1960. Laser light differs from ordinary light in a few areas. The most important difference is that laser light is highly directional. The laser light travels as parallel beam and spreads very little. It can travel in very narrow beams. Laser light is also electromagnetic waves. In comparison to microwave, laser light has higher frequency and shorter wavelength. Laser light can be used to measure speed and distance in the same way as the microwave radar. For example, YAG (crystalline yttrium aluminum garnet) laser and ruby laser have been used as range finder. The YAG can emit very efficient and useful laser, in the near infrared, at 1.06 micrometer wavelength.

Semiconductor junction lasers or diode lasers are very small, one millimeter or even smaller, typically emitting about 10 milliwatts of power and can be produced inexpensively. A light-weight laser radar sensory device has been developed for use in special canes for the blind, with two or three Gallium Arsenide lasers. It is low-powered and its safety has been proven for outdoor and indoor daily living usage. Gallium arsenide laser is one example of the semiconductor lasers. The semiconductor lasers are usually very small, less than one millimeter in any direction. They can be easily assembled into compact arrays of many units.

With heterostructure, gallium arsenide (GaAs) lasers can operate continuously in room temperature. The laser light can be modulated by varying the diode current. By alloying different proportions of two semiconductors, diode lasers can be fabricated to radiate at any wavelength from 0.64 to 32 micrometers. For example, the heterostructure of gallium indium arsenide phosphide sandwiched between layers of indium phosphide can radiate at 1.3 micrometers.

The laser beams are highly directional. The laser receiving equipment are also highly directional. Since the laser receiving equipment will receive only the laser beams aimed at it, most interference can be avoided. This is an important advantage over the microwave radar. When there are multiple cars with the same laser radars at the same scene, their reflected signals will not interfere with each other. Confusion can be easily avoided.

This invention will utilize laser radars in the first, second and third embodiments to detect the presence of any obstacle and the obstacle's location, distance, direction of movement and speed of movement.

Review of Laser Gyroscope

Laser gyroscope is the modern type of gyroscope with higher degree of accuracy, cheaper and much smaller than the traditional mechanical gyroscope. It can give directional information precisely. A typical laser gyroscope is made of glass-like material and is shaped like a triangle or a rectangle. A laser beam is generated and split into two parts that travel in opposite directions around the triangle or rectangle. Laser gyroscope has been used by airlines as automatic pilots to keep the airplanes on course. If the aircraft moves off course, the movement to one side will make one laser beam travel further than the other. Computer can analyze how much the laser beams are out of step and compute the plane's change in direction. Therefore, laser gyroscope can sense the rotation rate or direction change rate accurately.

This invention will utilize a laser gyroscope in the third embodiment to detect a system-equipped vehicle's directional change. In the fourth embodiment, a laser gyroscope will be utilized in a wheel skidding detecting system.

Before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the concept, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

The First Preferred Embodiment

In the first preferred embodiment of this invention, at least one set of laser radar is mounted on the front side of a roadway vehicle. Each set consists of one or a plurality of laser radar units. Gallium arsenide lasers or other types of lasers may be used for the laser radar units for the present invention. Each laser radar unit has an accompanying transmitter and a receiver.

There are numerous ways to array the laser radar units on a roadway vehicle. FIG. 1 illustrates a vehicle (100) equipped with three laser radar units (11, 12, 13) mounted at the front side of the vehicle, one unit (11) being mounted near the right end of the front side of the vehicle, one unit (13) near the left end of the front side of the vehicle, and the other unit (12) near the middle of the front side of the vehicle. All of these three laser radar units are directed forward.

Figure 2:
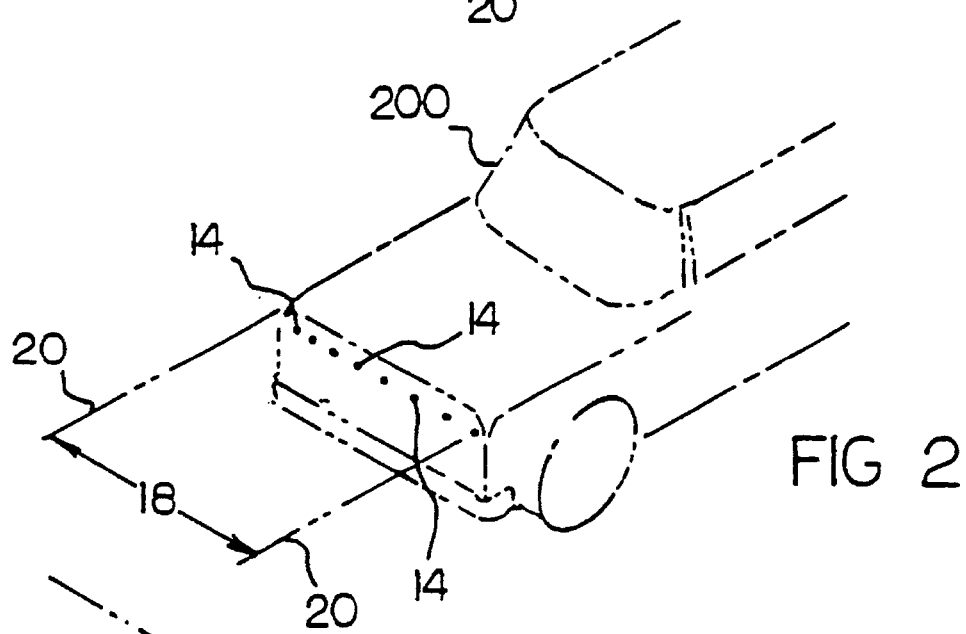
FIG. 2 is a view of an alternative arrangement of the laser radar units in the first embodiment of the present invention.

FIG. 2 illustrates a vehicle (200) equipped with a plurality of small laser radar units (14) horizontally arrayed evenly on the front side of the vehicle. The purpose of numerous small laser radar units closely arrayed together is to minimize the dead space within the scanning zone of the laser radars. Thus small obstacles in front of the vehicle can be detected.

Figure 3:
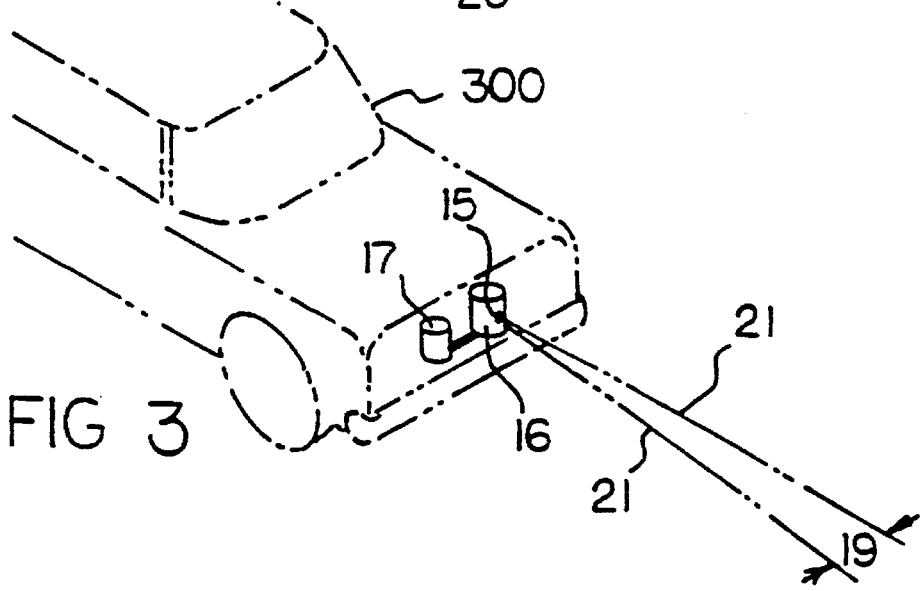
FIG. 3 is a view of another alternative arrangement of the laser radar units in the first embodiment of the present invention.

A laser radar unit can also be mounted on a rotatable structure which can be rotated to change the orientation of the laser radar unit. FIG. 3 illustrates a single laser radar unit (15) mounted on a cylindrical structure (16), wherein the cylindrical structure is mounted near the midpoint of the front side of a vehicle (300). The cylindrical structure can be rotated around its axis, said axis being perpendicular to the ground. The cylindrical structure is functionally connected with an electric motor (17) which can rotate the cylindrical structure through a belt, gears or an axle (not shown) clockwise and counterclockwise, back and forth, through a small predetermined angle such that the laser radar can scan a narrow band of desirable scanning zone (19) in front of the system-equipped vehicle. Alternatively, the cylindrical structure (.16) is rotated by the electric motor (17) in full circles in one direction, while the laser radar emits periodically. The laser radar will emit only when the laser radar is directed within the desirable scanning zone(19).

The scanning zone(18) for the FIG. 1 and FIG. 2 designs in the first embodiment is the area (18) in front of the vehicle within two parallel lines (20), each line being the extension of a line from the lateral side of the vehicle body. Whereas the scanning zone (19) for the FIG. 3 design of the first embodiment is the area (19) in front of the vehicle within two lines (21) which fan out with a very small angle from the midpoint of the vehicle's front side. Relatively narrow bands of scanning zone directly in front of the vehicle is preferable for the first embodiment to eliminate false positive warnings caused by roadside obstacles or obstacles in the adjacent traffic lanes. The scanning range is predetermined with a range gate or a filter.

It is well known that laser beams are highly directional. For example, a beam of ½ inch in diameter may, at most, spread to only 3 inches after traveling one mile. Because the laser beam is highly directional and the beam width is very narrow, the scanning zone in the first embodiment can be easily controlled and be highly specific and selective.

For this invention, laser radars which emit electromagnetic waves in the infrared range or the far infrared range will be utilized. Laser light does not penetrate the rain, sandstorm, fog or snow, etc. as well as microwave radar. However infrared light will penetrate rain, sandstorm, fog or snow better than visible light. Therefore, the rain or snow, etc. will affect the driver's vision much more than they affect the infrared laser radar. If the rain or snow etc. are heavy enough, they may reduce the effective range of the laser radar. In this situation, the driver's vision will be affected even more such that the driver should slow down the car speed. With reduced car speed, the reduced range of laser radar can still serve its function.

The laser radars will detect obstacles in front of the system-equipped vehicle within the selected scanning zone and scanning range. The laser radar will measure the distance and the relative speed in the radial direction of the laser radar beam between any obstacle and the system-equipped vehicle.

With highly directional character and with very small beam width, laser radars have other advantages as compared with microwave radars. The laser radar can easily avoid confusion caused by reflections from other laser radars in the vicinity. For microwave radars, reflected signals from adjacent vehicle with same or similar radar equipment can be received and become very confusing. Laser radars can avoid this disadvantage. The receiver of the laser radar is aimed at exactly the same direction as the associated transmitter. The receiver is also highly directional. The receiver will not receive the reflected back laser light emitted from other transmitters on the same vehicle or from transmitters on adjacent vehicles because ordinarily the other laser light reflection will come in a direction different from the receiver's direction, with the following two very rare and brief exceptions. The first exception is that confusion may occur when an oncoming vehicle's laser beam happen to aim at the system-equipped vehicle's receiver. In two moving cars, this situation will last at most only a minimal fraction of a second. A second exception is that confusion may occur when an adjacent vehicle's laser beam happens to illuminate at the same spot as the spot illuminated by the system-equipped vehicle's laser beam. Then the reflected laser light from the adjacent vehicle may come in the right direction for the system-equipped vehicle's receiver. Again, this situation should be very rare and should last for an extremely short period of time. Since these two situations are extremely rare and very brief, confusion and interference from adjacent vehicle's similar laser radar equipment virtually will not be a problem for laser radars in this invention.

Figure 4:
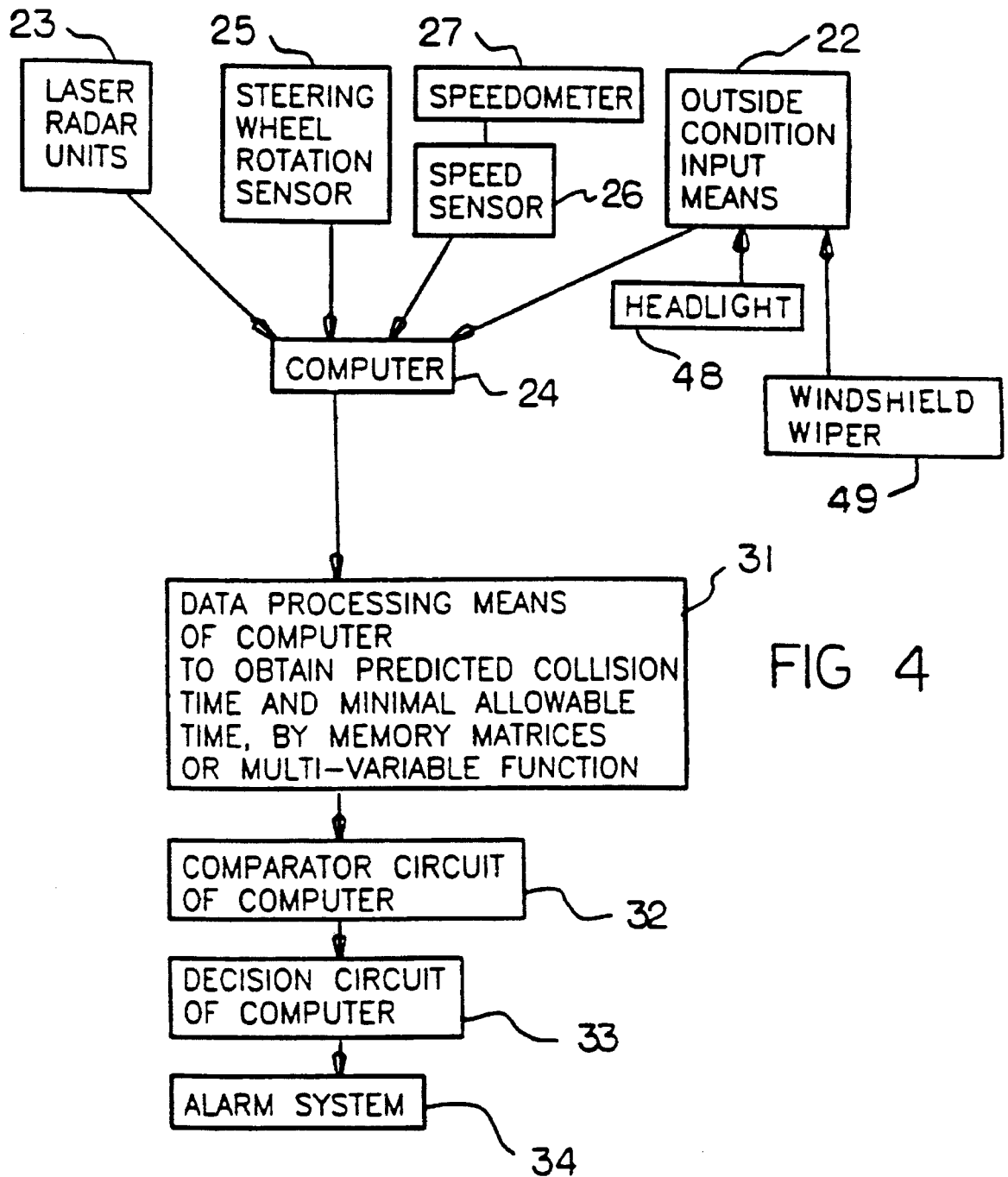
FIG. 4 is a block diagram of the first embodiment of this invention.

FIG. 4 illustrates a block diagram for the first embodiment of this invention. The laser radar units (23) are all functionally connected with a computer (24). When any laser radar (23) detects any obstacle, the laser radar will send electronic signals to the computer, said signals including the distance and the relative speed along the radial direction between the obstacle and the system-equipped vehicle. The computer (24) will process these signals to obtain a predicted collision time by dividing the detected distance by the detected relative speed as in the following formula:

$$\text{Predicted Collision Time} = \frac{\text{Distance between vehicle and obstacle}}{\text{Relative speed between vehicle and obstacle}}$$

The predicted collision time refers to the timing when collision will occur if the relative speed between the obstacle and the vehicle is unchanged.

The computer (24) uses pre-stored memory matrices, or multi-variable functions, or combination of both memory matrices and multi-variable functions to obtain a minimal allowable time. The minimal allowable time depends on multiple variables, including the relative speed, the vehicle's speed, the steering wheel information, road condition, visibility condition, and the driver's condition. The road condition refers to dry road, wet road, snowy or icy road. Paved or unpaved road is also a factor but will not be discussed hereto for simplicity. The driver's condition refers to driver's responsiveness, age, health, sex and other personal characters. The minimal allowable time can be either pre-stored in multiple memory matrices or calculated by using a multi-variable function "f":

$$T_{V,U,A,R,L,D} = f(V, U, A, R, L, D)$$

wherein "T" is the minimal allowable time; "V" represents the system-equipped vehicle's speed as obtained from a speedometer; "U" represents obstacle's relative speed in the radial direction as detected by the laser radar; "A" represents steering wheel information; "R" represents road condition; "L" represents day or night light; and "D" represents driver's condition. Other pertinent variables may also be incorporated into the aforementioned function "f". The exact formula of the multi-variable function "f" depends on the model of the vehicle and the type of brakes and tires used.

Furthermore, a plurality of safety levels may be selected in association with the minimal allowable time, for example, a disastrous level minimal allowable time, a critical level minimal allowable time, and a warning level minimal allowable time. The disastrous level minimal allowable time is the time obtained by calculation with the multi-variable function "f" or by specifically reading from multiple memory matrices. The critical level minimal allowable time is the sum of disastrous level minimal allowable time plus a first predetermined time, while the warning level minimal allowable time is the sum of the critical level minimal allowable time plus a second predetermined time.

Referring back to FIG. 4, a steering wheel rotation sensor (25) is functionally connected with the computer (24). Said steering wheel rotation sensor (25) can send electronic signals about the steering wheel rotation information, including steering wheel rotation direction, degree, speed and acceleration, to the computer (24). A speed sensor (26) is functionally connected with a speedometer (27) of the vehicle, and the speed sensor is also functionally connected with the computer (24). The speed sensor (26) can convert the speed information from the speedometer (27) into electronic signals and send the signals to the computer (24).

Figure 5:
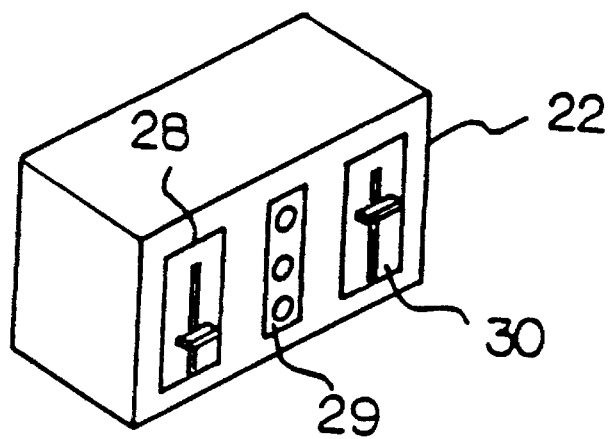
FIG. 5 illustrates an outside condition input means with a plurality of selectors, each for one outside condition, to be utilized in the first, the second and the third embodiments.

As illustrated in FIGS. 4 and 5, an outside condition input means (22) is also functionally connected with the computer (24). Said outside condition input means (22) includes a plurality of selectors, each selector for one outside condition, including a road condition selector (28), a day or night light selector (29), and a driver's condition selector (30). Each selector consists of either a selection scale or selection buttons. The vehicle user can manually move the road condition selection scale or push the selection buttons to match the ongoing road condition. Similarly, the vehicle user can manually choose the light condition selector (29) to match the current visibility; and choose the driver's condition selector (30) to match the driver's current physical and mental condition.

For simplicity, the day or night light selector (29) may be substituted by an automatic design by connecting a branch circuit from a headlight (48) of the vehicle to the light selector (29) of the outside condition input means (22). Thus when the headlight (48) is turned on, the computer (24) will receive a signal to automatically select a poor visibility condition; and when the headlight is turned off, the computer will automatically select a good visibility condition. Similarly, the road condition selector (28) may be supplemented by a branch circuit from a windshield wiper (49) of the vehicle to the road condition selector (28) of the outside condition input means (22) such that when the windshield wiper is turned on, the computer (24) will automatically receive a signal to select a wet or slippery road condition.

Thus the computer (24) will receive input data regarding all of the pertinent variables "V", "U", "A", "R", "L", "D". The computer includes data processing means (31) to process these input data, either through reading of the memory matrices or through calculation utilizing the multi-variable function "f" to obtain the minimal allowable time. Through a comparator circuit (32) of the computer, the computer can compare the predicted collision time with the minimal allowable time and generate a signal for the comparison result and send the signal to a decision circuit (33) of the computer. When the predicted collision time is shorter than the minimal allowable time, a commanding signal will be sent by the decision circuit (33) of the computer to an alarm system (34) to actuate an audible and/or visible alarm to warn the vehicle user.

Different levels of audible and/or visible alarm may be adapted when a plurality of safety levels are adapted in association with the minimal allowable time. For example, when the predicted collision time is shorter than the disastrous level minimal allowable time, an uppermost degree of alarm will be actuated. When the predicted collision time is shorter than the critical level minimal allowable time, a less serious degree of alarm will be actuated. When the predicted collision time is shorter than the warning level minimal allowable time, a further less serious degree of alarm will be actuated.

The laser radars in the first embodiment are arrayed in such ways that the laser radars will scan narrow bands of the scanning zone directly in front of the vehicle. The relative speed information obtained by a single laser radar or laser radars with parallel beams includes only the speed component in the radial direction of the laser beams. Thus the first embodiment will function very well when dealing with an obstacle directly in front of the system-equipped vehicle and the obstacle is moving either in the same or the opposite direction as the vehicle's direction. However, the first embodiment's function is partially limited when dealing with an obstacle which is located in front of the vehicle and is moving in a direction different from the vehicle's course of movement. The obstacle may be detected by the laser radar and cause an unnecessary alarm. The unnecessary alarm will be brief and cease after the obstacle has moved out of the vehicle's laser radar scanning zone. The first embodiment's function will also be partially limited when dealing with an obstacle which suddenly moved into the system-equipped vehicle's laser radar scanning zone within a very short distance. This will cause a precipitated alarm. An uppermost degree of alarm may be reached suddenly without going through earlier stages of less serious degrees of alarm. When faced with a precipitated alarm, the vehicle user may not have enough time to prevent a collision from happening. However, even a precipitated alarm is still much better than no warning at all. It is well known that a slightly sooner response from the driver, even only half a second sooner, will greatly decrease the severity of a car accident.

Besides at least one laser radar unit being mounted on the front side of a vehicle as described hereto, the first embodiment may be expanded to include at least one laser radar unit being mounted on the rear side, the right side or the left side of the vehicle to warn the vehicle user about probable collisions with obstacles coming from the rear, the right or the left of the vehicle in accordance with the teachings of the present invention.

The advantage of the first embodiment is that it requires much less sophisticated computer and will cost less as compared with the second and the third preferred embodiments of this invention, to be described hereafter.

The Second Preferred Embodiment

The second preferred embodiment is designed to overcome the above limitations of the first embodiment by broadening the scanning zone for the laser radars, using at least two sets of laser radars and using more sophisticated computer to detect the movement direction of obstacles, the relative speed of obstacles including the radial speed component and nonradial speed component, and to predict the courses of movement of the vehicle and obstacles in the near future.

Figure 6:
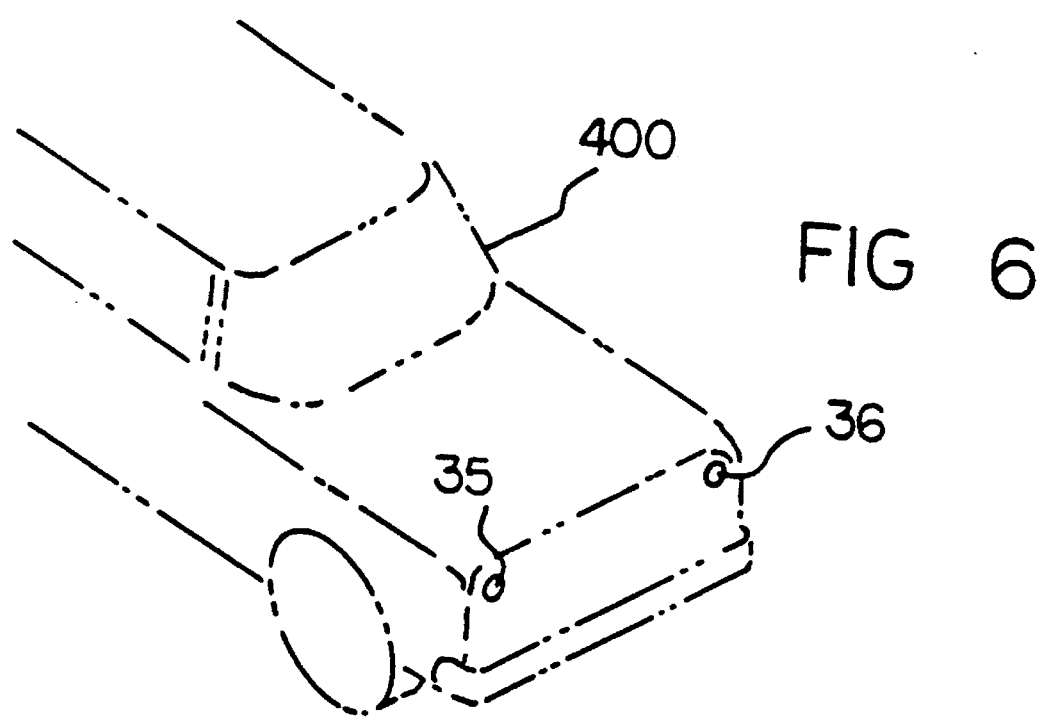
FIG. 6 is a view of an arrangement for two laser radar sets utilized in the second embodiment of the present invention.
Figure 7:
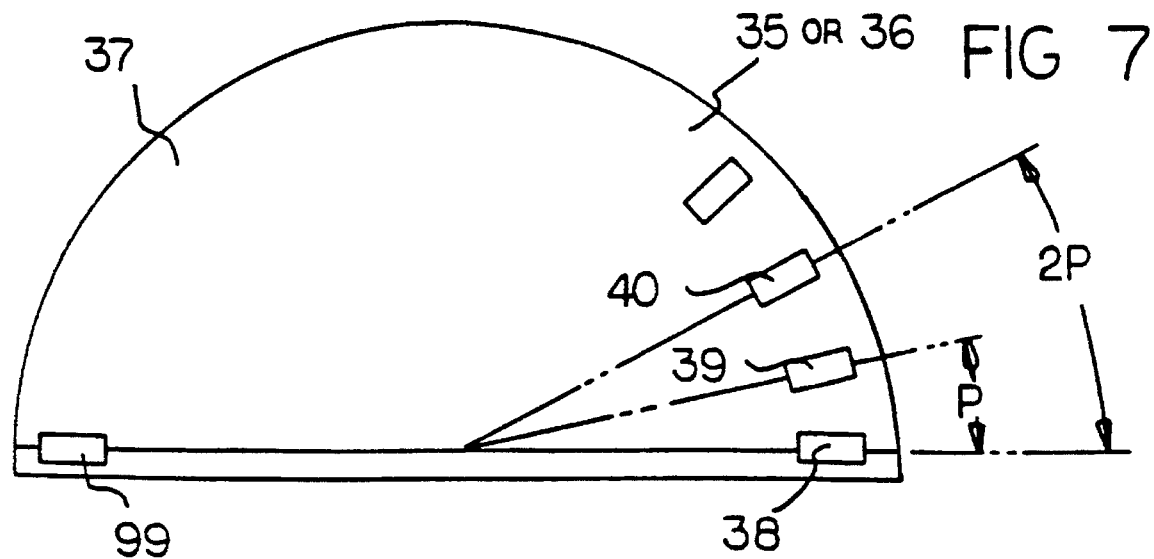
FIG. 7 illustrates one design of a laser radar set in the second embodiment of this invention, wherein a plurality of laser radar units are evenly separated and arrayed on a semicircular disc, with the first laser radar unit directed at 0 degree, the second laser radar unit directed at p degrees, and the third unit directed at 2p degrees and so forth.

As illustrated in FIG. 6, the second embodiment includes two laser radar sets (35, 36), one set (35) being mounted near the right end of the front side of a system-equipped vehicle (400), and the other set (36) being mounted near the left end of the front side of the vehicle (400). Each set of laser radars includes a plurality of laser radar units evenly separated and arrayed on a semicircular disc (37), as illustrated in FIG. 7. The first laser radar (38) is aiming at near zero degree direction; the second laser radar (39) is aiming at "p" degree direction; the third laser radar (40) is aiming at "2p" degree direction; and so forth; while the "n"th laser radar (99) is aiming at "(n−1)p" degree direction which is approximately 180 degree direction. Thus each laser radar set can scan nearly 180 degree semicircular zone in front of the vehicle. The radius of the said semicircular scanning zone is the range of each laser radar unit. The range of the laser radar unit is preselected by a range gate or a filter as described under the first embodiment.

The predetermined direction of each of the foregoing laser radar unit (38, 39, 40,—99) is associated with an angle message. Electronic signals of these angle messages are sent to or stored in a computer (52) in a way such that the computer can select the angle message associated with the laser radar unit which has just received reflected laser radar signals to determine the direction of location of a detected obstacle. The computer can also process the laser radar signals reflected by the obstacle to determine the distance and relative speed of the obstacle in the radial direction.

Figure 8:
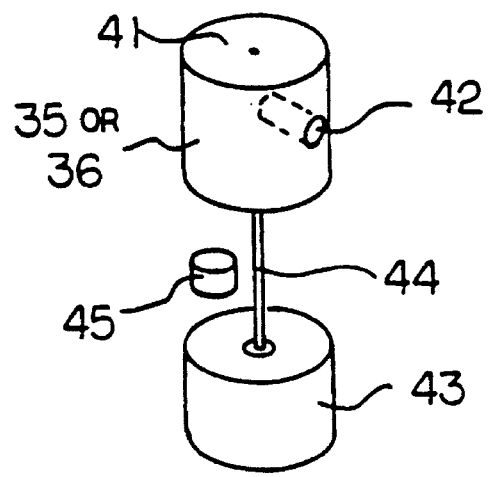
FIG. 8 illustrates an alternative design of a laser radar set in the second embodiment, wherein a single laser radar unit is mounted on a cylindrical structure rotatable through at least 180 degrees.

FIG. 8 illustrates an alternative design of a laser radar set, wherein each of the two laser radar sets includes only one laser radar unit (42) mounted on a cylindrical rotator (41). The cylindrical rotator (41) is functionally connected with an electric motor (43) through a belt, gears, axle (44) or other connecting devices. The cylindrical rotator (41) can be rotated around the cylinder axis clockwise and counterclockwise, back and forth, through 180 or nearly 180 degree scanning zone. Alternatively, the cylindrical rotator (41) is rotated by the electric motor (43) in full circles in one direction, while the laser radar (42) emits periodically. The laser radar unit (42) can emit either at detectable angles or at predetermined angles. An angle sensor (45) is functionally connected with the cylindrical rotator (41). When the laser radar unit (42) is emitting at detectable angles, the angle sensor (45) can detect the emitting or receiving angle of the laser radar unit at the same moment when the laser radar unit receives reflected laser radar signals and generate electronic angle signals thereof. The computer (52) receives and processes the angle signals together with signals from reflected laser radar beams to determine the direction of location, relative speed and distance of the detected obstacle.

When the laser radar unit (42) emits at predetermined angles, the message of these predetermined angles is sent to or stored in the computer (52). The computer can select the angle message associated with the angle at which the laser radar unit (42) has just received reflected laser radar signals. The computer (52) receives and processes the angle message together with the signals from the reflected laser radar beams to determine the direction of location, the relative speed and the distance of the detected obstacle.

Depending on the size of the obstacle, one or more than one laser radar beams from the right laser radar set may be reflected back by an obstacle. When there are more than one laser beams reflected by a same obstacle, very likely the laser beams will detect slightly different distances and slightly different speeds due to different angles. When more than one laser beams are reflected back from a same obstacle, the computer will select the laser radar beam which detects the shortest distance as the representative laser beam and select the shortest distance as the representative distance. The computer will also select the relative speed and select the direction of the obstacle as detected by the representative laser radar beam as the representative relative speed and representative direction, as measured by the right laser radar set. When only one laser beam is reflected by an obstacle, the computer will use this laser radar beam as the representative laser beam. Similarly, when more than one laser beams from the left laser radar set are reflected by a same obstacle, the computer will select representative laser beam, and the associated representative distance, direction and relative speed, as measured by the left laser radar set.

When a system-equipped vehicle and an obstacle are both moving along an imaginary line which connects the vehicle and the obstacle, the representative relative speed as measured by the right laser radar set will be virtually the same as the representative relative speed as measured by the left laser radar set.

When either the system-equipped vehicle or the obstacle is not moving along the imaginary line connecting them, the representative relative speed as measured by the right laser radar set will be different from the representative relative speed as measured by the left laser radar set because each laser radar set measures a component of the relative speed along its own radial direction. Since the right laser set and the left laser set are separated by a known distance (several feet), with geometric and trigonometric principles, the computer can use the above difference in measured representative relative speeds to calculate the direction of movement of the obstacle and the relative speed of the obstacle as relative to the vehicle, including the radial speed component and the nonradial speed component.

Figure 9:
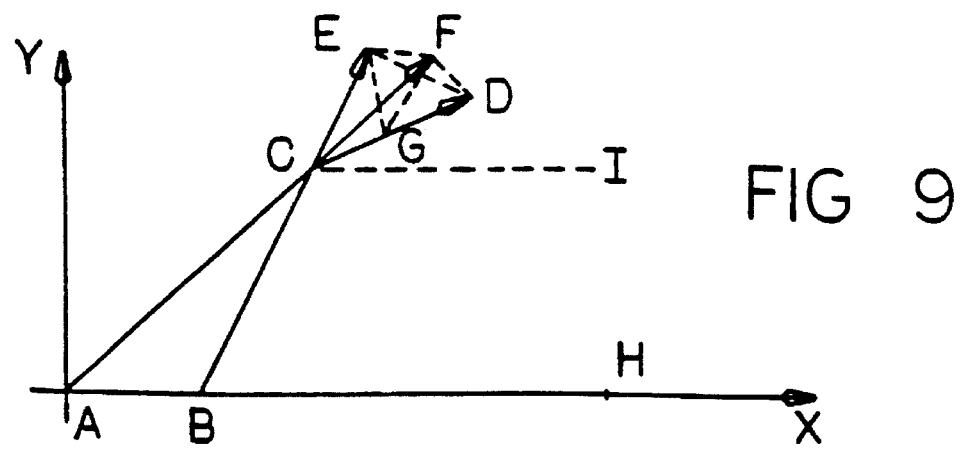
FIG. 9 illustrates a geometric and trigonometric drawing, as an example, to find the speed and the direction of movement of an obstacle.

FIG. 9 illustrates, as an example, how geometric and trigonometric principles can be used to calculate the direction of movement and the speed of the obstacle. In FIG. 9:

Point A represents left laser radar set.

Point B represents right laser radar set.

Point A is the origin of a coordinate system,

Point B and Point H are on the positive half of X-axis.

AB is the distance between right and left laser radar sets (known).

Point C represents the obstacle's location.

Angle CAB is the direction of location of the obstacle, if Point A is used as the reference point of the system-equipped vehicle.

AC is the distance between the left laser radar set and the obstacle (measured).

BC is the distance between the right laser radar set and the obstacle (measured).

$\overrightarrow{CD}$ is a vector representing the relative speed and direction of movement of the obstacle as relative to the system-equipped vehicle.

$\overrightarrow{CF0}$ is a vector representing the radial component of the relative speed of the obstacle along the direction of Line ACF, as measured by the Laser Set A, wherein Line ACF is a straight line and Angle CFD is a right angle $\overrightarrow{CE}$ is a vector representing another radial component of the relative speed of the obstacle along the direction of Line BCE, as measured by Laser Set B, wherein Line BCE is a straight line and Angle CED is a right angle.

Line CI is a line parallel to Line AH (X-axis).

Angle CBH is the angle of right representative laser radar beam (known).

Angle CAH is the angle of the left representative laser radar beam (known).

Angle ACB=Angle CBH−Angle CAH.

Angle ECF=Angle ACB.

Since CE, CF, and Angle ECF are all known, with a trigonometric principle, the Law of Cosines, EF can be calculated.

Because Angle CFD and Angle CED are both right angles, Points C, D, E, and F are all located on an imaginary circle with Point G as the center of the circle.

Therefore Angle EGF=Angle ECF×2.

Angle ECF=Angle ACB=Angle CBH−Angle CAH.

Triangle GEF is an equilateral triangle, therefore Angle GEF=Angle GFE=½×(180−Angle EGF)

With EF, Angle GEF, and Angle GFE all known, EG and GF can be calculated with another trigonometric principle, the Law of Sines.

CD=2×EG wherein CD is the speed of the obstacle.

Angle ECD can be calculated from the formula Cosine ECD×CD=EC

Angle CBH=Angle ECI=Angle ECD+Angle DCI

Therefore Angle DCI=Angle CBH–Angle ECD wherein Angle DCI is the direction of movement of the obstacle.

The above example demonstrates that in the second embodiment, trigonometric and geometric principles can be utilized to calculate the relative speed of the obstacle, based on the relative speed component in the radial direction as measured by the right laser radar set and the relative speed component in another radial direction as measured by the left laser radar set. The trigonometric and geometric principles can also be utilized to calculate the direction of movement of the obstacle as relative to the system-equipped vehicle, based on the information detected by the right laser radar set and the information detected by the left laser radar set.

Figure 10:
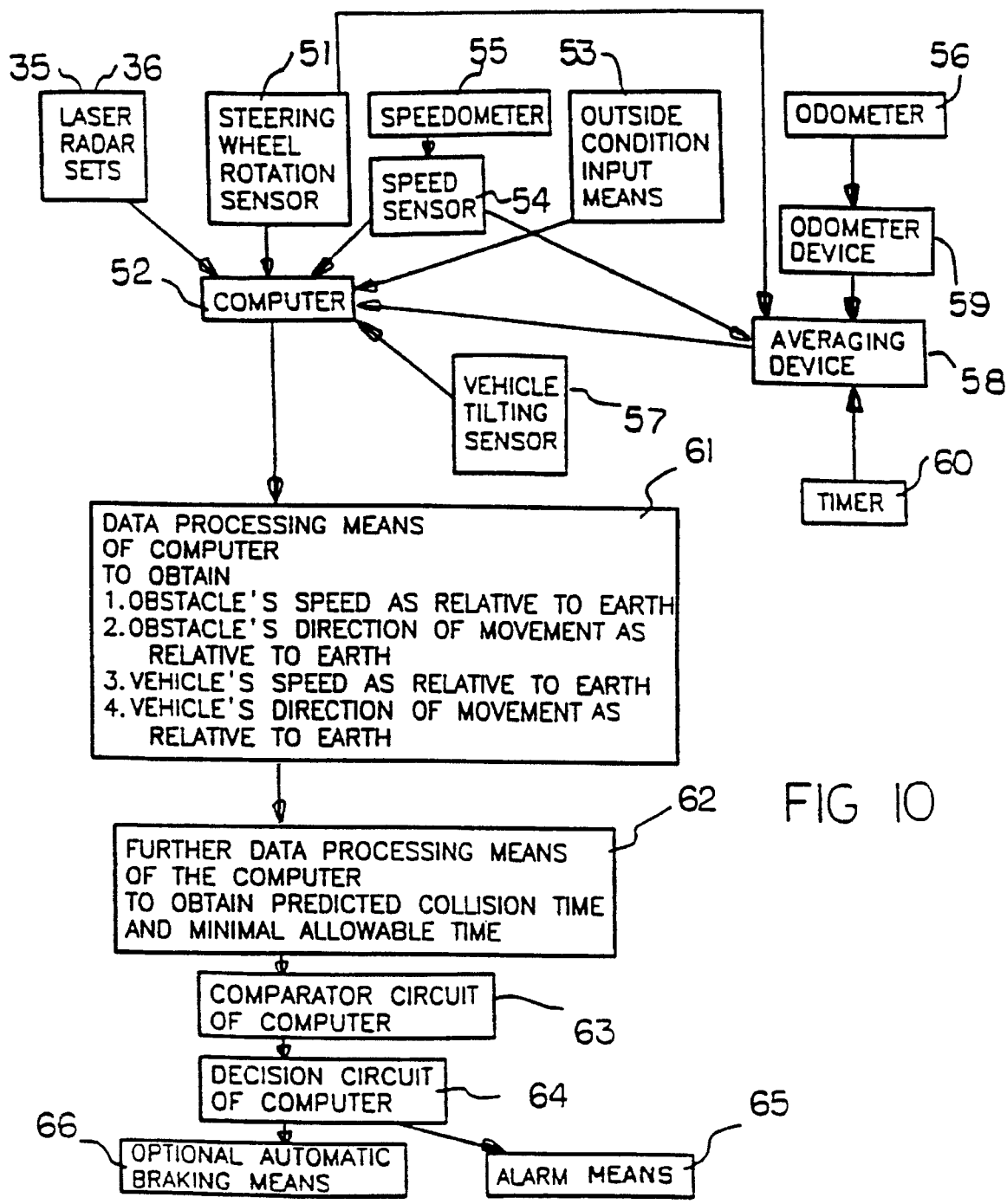
FIG. 10 is a block diagram of the second preferred embodiment of this invention.

As illustrated in FIG. 10, in the second embodiment, the right and the left laser radar sets (35, 36) are functionally connected with the computer (52). The second embodiment further includes a steering wheel rotation sensor (51) which is functionally connected with the computer (52). The steering wheel rotation sensor (51) can detect the rotation information of the steering wheel and convert the information into electronic signals thereof. The signals from the steering wheel rotation sensor (51) is sent to the computer (52) so that the computer can determine the direction of movement of the system-equipped vehicle.

Still referring to FIG. 10, the second embodiment further includes an outside condition input means (53) and a speed sensor (54) being connected with the vehicle's speedometer (55). The outside condition input means (53) and the speed sensor (54) are both functionally connected with the computer (52) such that the computer will receive signals for the road condition, the visibility condition, the driver's condition and the vehicle speed in the same way as in the first embodiment.

The computer can also estimate the size of any detected obstacle by counting the number of laser radar beams which are reflected back by the said obstacle. Since each laser radar beam is separated from the next laser radar beam by a known degree of angle, the total angular dimension of the obstacle can be estimated. The size of the obstacle can be calculated by the formulas:

Size of Obstacle = Distance × Sine function of the angular dimension or

Size of obstacle = $2\pi$ × Distance × $\frac{\text{angular dimension}}{360}$

Thus, the computer in the second embodiment has a data processing means (61) to process the input signals to obtain all of the following data: the speed of any obstacle as relative to the system-equipped vehicle, the direction of movement of the obstacle as relative to the vehicle, the exact location of the obstacle including its distance and its direction, the speed of the vehicle as relative to the earth, and the direction of movement of the vehicle as relative to the earth. With these data, the data processing means (61) of the computer (52) can find out whether the obstacle is moving, and if it is moving, the computer can calculate and find out the speed of the obstacle as relative to the earth and the direction of movement of the obstacle as relative to the earth (by addition of vectors).

With the data of the obstacle's speed as relative to the earth, obstacle's direction of movement as relative to the earth, and obstacle's distance and direction of location, a further data processing means (62) of the computer can further process the data and predict the location and course of movement of the obstacle in the near future if the obstacle continues to move at its current speed and direction. Similarly, with the data of the system-equipped vehicle's direction of movement and speed as relative to the earth, the further data processing means (62) of the computer can predict the location and course of movement of the vehicle in the near future if the vehicle continues to move at its current speed and direction.

With the data of the predicted location and course of movement of the obstacle and the predicted location and course of movement of the system-equipped vehicle available, the further data processing means (62) of the computer can determine whether there is any danger that the obstacle and the vehicle will move to a same location at a same time in the near future. Thus the computer can predict when a collision might happen if both the obstacle and the vehicle continue to move at their own current speeds and directions. Thus the further data processing means (62) of the computer in the second embodiment can determine the predicted collision time.

The minimal allowable time for the second embodiment can be obtained in a similar way as in the first embodiment. The obstacle's size ("S") and the obstacle's location ("Z") including obstacle's distance and obstacle's direction of location, the obstacle's speed as relative to the earth ("W"), and obstacle's direction of movement as relative to the earth ("Y") will be variables influencing the minimal allowable time, in addition to the already described variables, including system-equipped vehicle's speed ("V"), road condition ("R"), light condition ("L"), driver's condition ("D") and the steering wheel information ("A"). The further data processing means (62) of the computer will receive the data for all of the variables. With this input data, either through memory matrices or through a multi-variable function "g"

$$T_{V,W,A,R,L,D,S,Y,Z}=g(V,W,A,R,L,D,S,Y,Z)$$

the computer can obtain the minimal allowable time ("T") similar to the first embodiment.

A comparator circuit (63) of the computer then compares the predicted collision time with the minimal allowable time. When the predicted collision time is shorter than the minimal allowable time, a decision circuit (64) of the computer will send a commanding signal to an alarm system (65) to actuate an audible and/or visual alarm in a similar way as the first embodiment.

As already described in the first embodiment, a plurality of safety levels may be selected in association with the minimal allowable time such that a plurality of correlated degrees of audible and/or visual alarm may be adapted.

As will be obvious to those skilled in the art, false positive alarm is usually not a problem in the collision avoidance system of the second embodiment. Thus an optional automatic braking device may be incorporated into the collision avoidance system. A plurality of designs are applicable for an automatic braking device. As an example, an automatic braking device consists of an electric pump functionally connected to the hydraulic system of a vehicle's brake system. The pump can be actuated by a braking commanding signal sent by the computer such that the hydraulic pressure in the brake system is increased to brake the vehicle.

The automatic braking device is suitable when the vehicle user is unresponsive. Referring back to FIG. 10, the decision circuit (64) of the computer further includes means to detect any response from the vehicle user within a predetermined period of time after an uppermost degree alarm has been actuated. The vehicle user's response includes any active application of at least the accelerator, the brake or the steering wheel. A sudden change of the vehicle's speed as detected by the speed sensor (54) and the speedometer (55) exceeding a predetermined amount, or a sudden change of the vehicle's direction of movement as detected by the steering wheel rotation sensor (51) exceeding a predetermined amount constitute input information for a vehicle user's response. When the decision circuit (64) of the computer does not receive any input information for the vehicle user's response within a predetermined period of time after an uppermost degree alarm has been actuated, the decision circuit (64) will send a braking commanding signal to an optional automatic braking device (66) to actuate automatic braking of the vehicle. After a braking commanding signal has been sent out by the decision circuit (64) of the computer, reception of input information from the steering wheel rotation sensor (51) will cause the decision circuit (64) to cancel the braking commanding signal. The automatic braking device can decrease the severity of car accidents. For special purpose situations or for vehicle users who have past medical history of fainting spells, the automatic braking device may be actuated sooner, by making its activation associated with either the less serious degree alarm or the further less serious degree alarm, such that an accident may be prevented or minimized.

Alternatively, the automatic braking device (66) can be actuated by the computer (52) when the computer determines a collision is imminent and can be deactivated by the computer when imminent collision does not exist.

Besides at least two laser radar sets being mounted on the front side of a vehicle as described hereto, the second embodiment may be expanded to include at least two laser radar sets being mounted on each of the rear side, the right side or the left side of the vehicle to prevent collisions with obstacles coming from the rear, the right or the left of the vehicle, in accordance with the teachings of this invention. The optional automatic braking device is applicable only for a collision avoidance system for the front side of a vehicle. The optional automatic braking device is usually not suitable to be used in association with a collision avoidance system for the rear side, the right side or the left side of the vehicle.

The vehicle's direction of movement can be influenced by uneven or tilted road surfaces. It has been well known in the prior art that the relationship between the steering wheel rotation and the vehicle's direction of movement should be modified when vehicle tilting is present. As an optional design, this invention may further include a vehicle tilting sensor (57), as shown in FIG. 10. The vehicle tilting sensor (57) may be a levelling device (of conventional structure, detail not described) or a vertically mounted laser gyroscope. The vehicle tilting sensor (57) can convert the information of the vehicle body's tilting direction, degree and tilting speed into electronic signals. The computer (52) can receive and process the signals from the vehicle tilting sensor (57), to supplement the aforementioned steering wheel information and vehicle speed signals to determine the vehicle's direction of movement. Incorporation of the vehicle tilting sensor (57) into this invention can modify the information of steering wheel rotation to improve the accuracy in determination of the vehicle's direction of movement.

It also has been well known in the prior art that uneven wheel alignment, uneven inflation of tires, uneven treads of tires, uneven weight of the vehicle and other factors may influence the relationship between steering wheel rotation and vehicle's direction of movement. These influencing factors can be corrected by an optional averaging device (58). The averaging device (58) may be part of the computer (52) or be an electronic device integrated with the computer. It is reasonable to assume that the average steering wheel rotation over a predetermined distance or duration of vehicle traveling should practically equal to zero if these influencing factors are absent. An odometer device (59) is functionally connected with an odometer (56) and the averaging device (58) such that the odometer device can convert information of distance traveled from the odometer into electronic signals and send the signals to the averaging device. The averaging device (58), by receiving and processing signals from the steering wheel rotation sensor (51), and the speed sensor (54), or the odometer device or a timer (60) can determine the average steering wheel rotation over a predetermined distance or duration of vehicle traveling preceding the moment of this determination. If the average steering wheel rotation does not equal to zero, the deviation is used as a correction factor which can be determined either continuously or intermittently. The averaging device (58) can generate correction factor signals thereof. The computer (52) receives and processes the correction factor signals to correct or to modify the signals from the steering wheel rotation sensor (51). Utilization of the averaging device (58) will further improve the accuracy of this embodiment.

The computer (52) can utilize the information from the vehicle tilting sensor (57) and the information from the averaging device (58), to supplement all of the other input signals, to determine when a collision is imminent.

The Third Preferred Embodiment

The second preferred embodiment of this invention utilizes a steering wheel rotation sensor to send the computer information about the direction of movement of a system-equipped vehicle. The advantage of a steering wheel rotation sensor is that it is relatively simple and inexpensive. The disadvantages of steering wheel rotation sensor include a plurality of factors which can cause inaccuracy in the prediction of direction of movement of the system-equipped vehicle, wherein the factors producing inaccuracy include wheel skidding, wheel locking, unbalanced brakes, unbalanced wheel alignment, unbalanced tire, and uneven or tilted road surfaces. Inaccuracy from wheel skidding and wheel locking will be significant because when faced with impending collision, the vehicle user often has panic steering and/or panic braking which often result in wheel skidding and/or wheel locking. Furthermore, vehicle collision often occurs on slippery roads, including wet roads, icy or snowy roads, which cause wheel skidding. Inaccuracy produced by uneven or tilted road surface can be improved by incorporating the aforementioned vehicle tilting sensor (57) into the present invention. The averaging device (58) may also help. However, other factors producing inaccuracy are still present.

The third embodiment will utilize a laser gyroscope to measure the directional change of a system-equipped vehicle to avoid the above disadvantages of the second embodiment.

Figure 11:
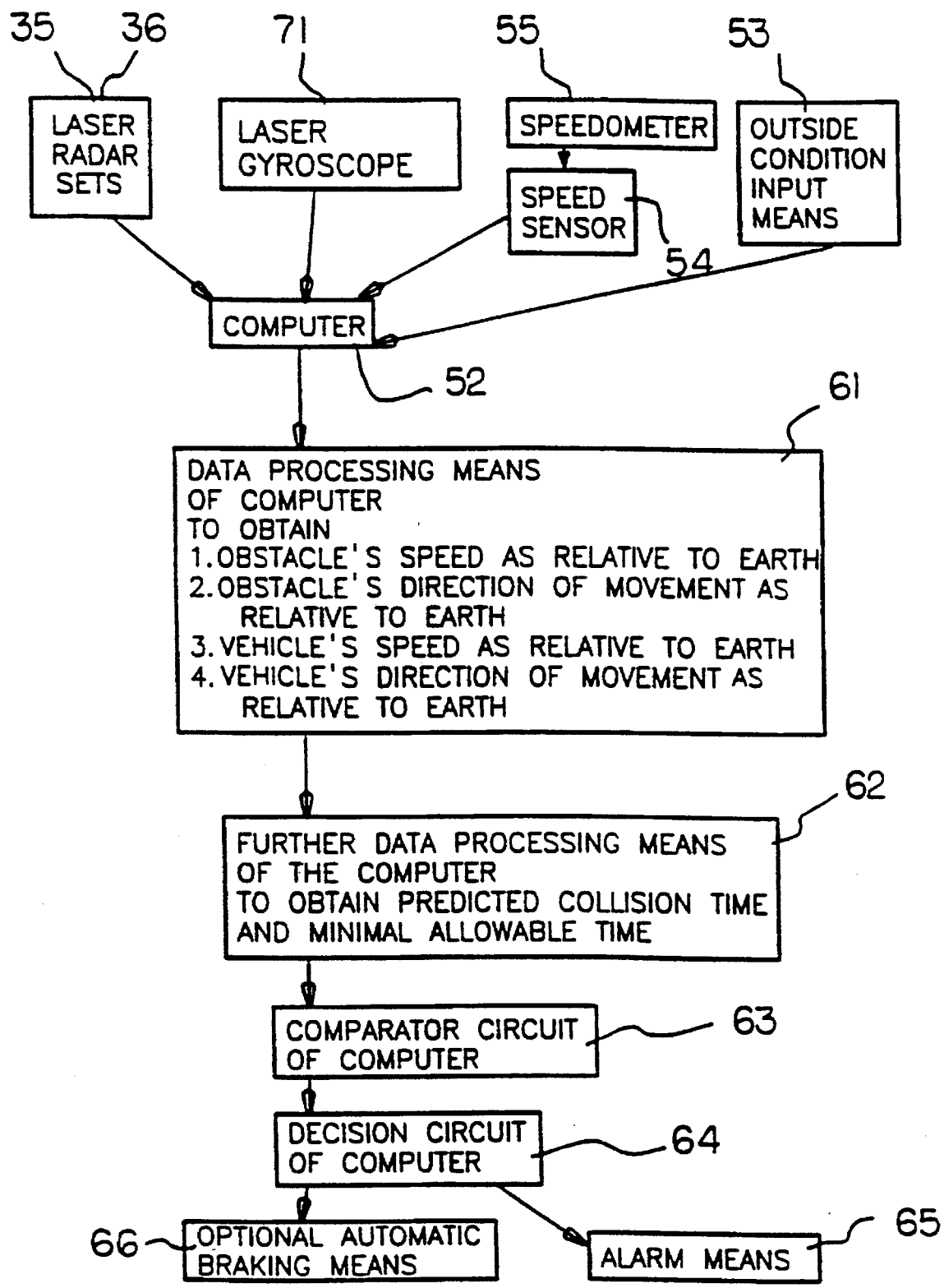
FIG. 11 is a block diagram of the third preferred embodiment of this invention.

As illustrated in FIG. 11, the third embodiment utilizes a laser gyroscope (71) to substitute for the steering wheel rotation sensor (51) in the second embodiment. The laser gyroscope (71) is horizontally mounted on a system-equipped vehicle to detect any directional change rate of the vehicle in the horizontal plane. The laser gyroscope further includes means to process the information of the vehicle's directional change rate to determine the vehicle's direction of movement (of conventional art, detail not described hereof). The laser gyroscope (71) is functionally connected with the computer (52) to send the computer electronic signals for the direction of movement of the system-equipped vehicle. All of the other functional components, designs and operating principles of the third preferred embodiment of this invention are the same as described under the second preferred embodiment.

It should be noted that the vehicle tilting sensor (57) and the averaging device (58) used in the second embodiment are not needed for the third embodiment.

The Fourth Preferred Embodiment

Wheel skidding is one of the major sources of vehicle collisions and accidents. However, none of the above three preferred embodiments provide any help in detecting and correcting wheel skidding. Utilizing part of the concepts and designs of the second and the third embodiments, a new and improved wheel skidding detecting system is hereupon disclosed.

The fourth embodiment utilizes a laser gyroscope and a steering wheel rotation sensor to create a new and improved wheel skidding detecting system. As already described in the Background Art of This Invention, a wheel skidding detecting device has been found to be very useful in a vehicle with rear wheel steering capability or a four-wheel steering vehicle.

Figure 12:
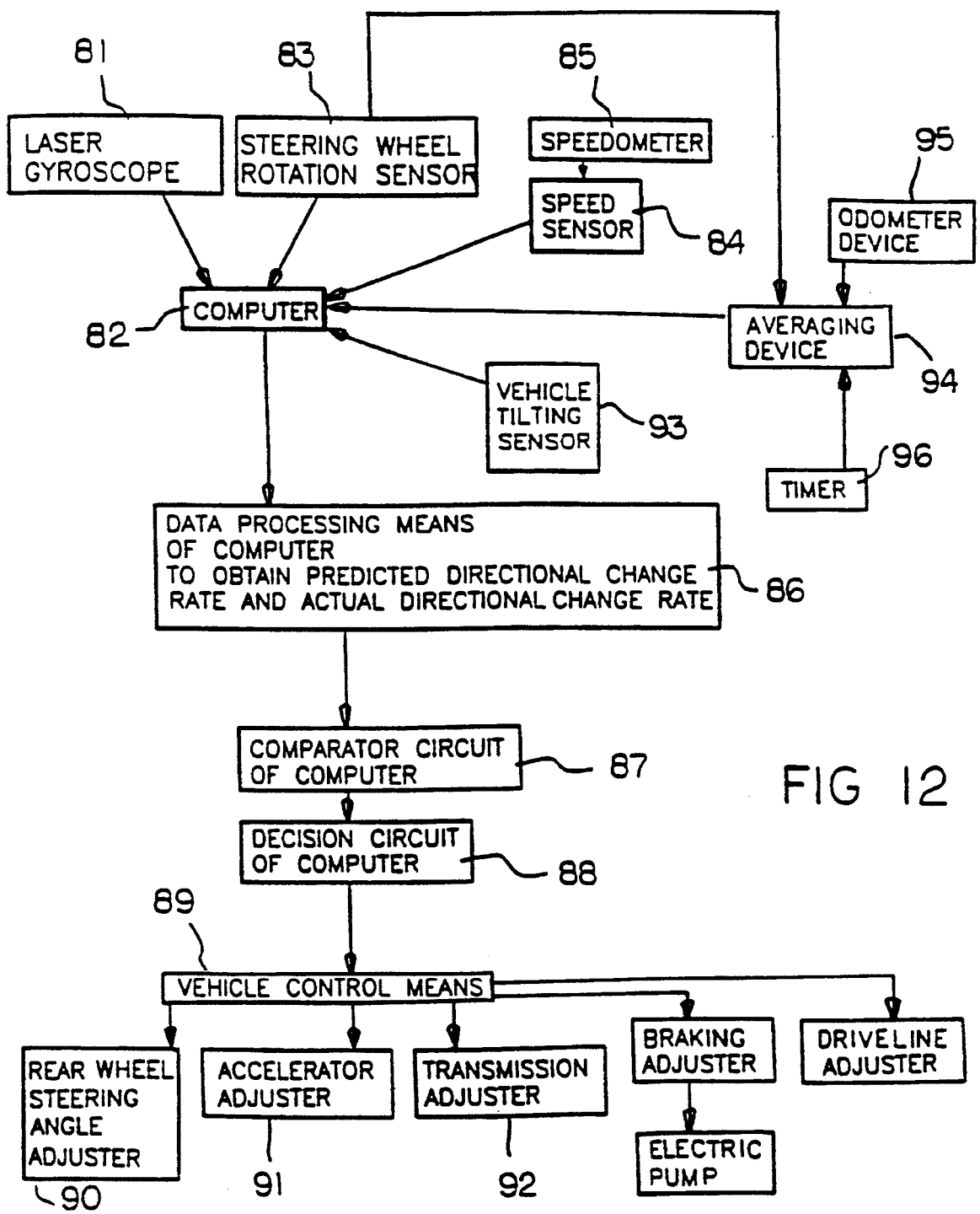
FIG. 12 is a block diagram of the fourth preferred embodiment of this invention.

FIG. 12 illustrates a new and improved wheel skidding detecting system. A laser gyroscope (81) is horizontally mounted on a vehicle to detect any horizontal directional change of the vehicle, and the laser gyroscope (81) can process the information to determine the actual directional change rate of the vehicle (of conventional art, detail not described hereof). The directional change rate is the degrees of directional change per second. The laser gyroscope (81) is functionally connected with a computer (82) and will send to the computer electronic signals of the actual directional change rate of the vehicle.

A steering wheel rotation sensor (83) is functionally connected with the computer (82) to give the computer electronic signals about the steering wheel rotation direction, degree, speed and acceleration. A speed sensor (84) is functionally connected with a speedometer (85) of the vehicle and the computer (82) such that the speed sensor can send to the computer electronic signals about the vehicle's speed. Optionally, the computer (82) may further receive and process signals from a vehicle tilting sensor (93), and correction factor signals from an averaging device (94). The averaging device is connected with the steering wheel rotation sensor (83), and an odometer device (95) or the speed sensor (84) or a timer (96). The designs and the functions of the vehicle tilting sensor (93) and the averaging device (94) are similar to the teachings of the second embodiment. A data processing means (86) of the computer can process the signals of the steering wheel information, the vehicle tilting signals, the correction factor signals and signals of the vehicle's speed to determine the vehicle's predicted directional change rate.

The predicted directional change rate of the vehicle depends on the vehicle's steerage design. For an ordinary two-front-wheel-steering vehicle, the vehicle's directional change rate is related to the steering wheel rotation and the vehicle's speed. For a four-wheel-steering vehicle, the predicted vehicle directional change rate is related to the vehicle's speed and the summation of the front wheel steerage and rear wheel steerage. For the foregoing summation, the rear wheel steerage is considered positive when in reverse-phase direction and considered negative when in coincidense-phase direction. For most of the four-wheel steering vehicles, the rear wheels are steered indirectly, depending on the vehicle speed and/or steering wheel angle and/or steering wheel rotating speed. Thus, for these types of four-wheel steering vehicles, all of the pertinent factors related to the rear wheel steerage and front wheel steerage should be included in the calculation to obtain the data of predicted directional change rate of the vehicle. This can be done easily for any particular type of rear wheel steerage because all of the pertinent sensors, including sensors for vehicle speed and/or steering wheel angle and/or steering wheel rotating speed and/or others, should be already present. All of the pertinent sensors can be functionally connected to the computer of this embodiment for the computer (82) to calculate the predicted directional change rate.

The computer also includes a comparator circuit (87) and the comparator circuit will compare the actual directional change rate of the vehicle with the predicted directional change rate of the vehicle. A discrepancy between the actual directional change rate and the predicted directional change rate exceeding a predetermined amount will indicate the presence of wheel skidding. The comparator circuit (87) of the computer can further process the magnitude, and positivity or negativity of the discrepancy between the actual and the predicted directional change rates to determine the magnitude and direction of wheel skidding. The comparator circuit (87) of the computer can further generate electronic signals for the presence, magnitude and direction of wheel skidding and the electronic signals are sent to a decision circuit (88) of the computer. The decision circuit (88) of the computer can generate an output electronic signal to be sent to a vehicle control means (89) to actuate an appropriate response or combination of responses.

This new and improved wheel skidding detecting system can be utilized with various vehicle control means (89), including designs to adjust vehicle acceleration, vehicle steering, vehicle braking, vehicle transmission or various combinations of them. The output electronic signals about wheel skidding from the decision circuit (88) of the computer are sent to the various vehicle control means to actuate a response or responses to alleviate or correct the wheel skidding. The nature and the ways the various vehicle control means can respond to the said output signals about wheel skidding depend on the various models and designs of the vehicles.

As described in the Background Art of This Invention, one example of the said vehicle control means (89) capable of responding to wheel skidding is a rear wheel steering angle adjusting device (90) for a four wheel steering vehicle. The electronic output signals about wheel skidding are sent to the said rear wheel steering angle adjuster (90) to adjust the steered angle of the rear wheels to alleviate or correct the wheel skidding.

The vehicle control means also includes a vehicle transmission adjusting means(92)(conventional art, detail not described). Upon receipt of the electronic output signals about wheel skidding, the transmission adjusting means (92) will automatically adjust the transmission to lower gears to alleviate the wheel skidding.

For vehicles with dual mode two-wheel drive/four-wheel drive system, the vehicle control means includes a vehicle transmission adjusting means and a vehicle driveline adjusting means. Upon receipt of the said output signals about wheel skidding, said transmission adjusting means will automatically shift the transmission to lower gears, and said driveline adjusting means will automatically adjust the driveline to four-wheel drive mode.

The vehicle control means further includes a vehicle accelerator adjuster (91) (conventional art, detail not described). Upon receipt of said output signals about wheel skidding, said accelerator adjuster will automatically decelerate the engine to alleviate wheel skidding.

With respect to the above description, it should be realized that the optimum dimensional relationships for the parts of the invention, to include variation in size, materials, shapes, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

We claim:

1. A collision avoidance system for a vehicle comprising:

at least two laser radar sets being mounted on at least one of the vehicle's four sides, including a front side, a rear side, a left side and a right side; wherein on each equipped side, at least one laser radar set is mounted near one end of the equipped side and at least another laser radar set is mounted near the other end of the equipped side of the vehicle, each laser radar set including at least one laser radar unit; wherein each laser radar unit includes a transmitter means for transmitting laser radar signals and a receiver means for receiving laser radar signals reflected by a detected obstacle from the transmitted laser radar signals, and generating first electronic signals representing the reflected laser radar signals thereof;

a computer means for receiving and processing the first electronic signals from each laser radar unit to determine the distance of the detected obstacle and the obstacle's radial component of relative speed along the laser beam direction, said relative speed of the obstacle being relative to the vehicle; wherein the computer means generates second electronic signals representing the distance and the radial component of the relative speed of the obstacle;

an angle message means functionally associated with each laser radar unit for providing third electronic signals representing the emitting or receiving direction of each associated laser radar unit;

a steering wheel rotation sensor means for detecting rotation information of a steering wheel of the vehicle and generating fourth electronic signals representing steering wheel rotation information;

a speed sensor means functionally connected with a speedometer of the vehicle for generating fifth electronic signals representing the vehicle's speed relative to the earth;

the computer means further receiving and processing information from the first, second, third, fourth and fifth electronic signals, wherein the computer means processes the received information to determine when a collision is imminent;

an alarm means functionally connected to the computer means for producing an alarm upon receipt of a signal from the computer means indicating a determination by the computer means that a collision is imminent;

an extrinsic condition input means for generating sixth electronic signals representing an extrinsic condition; wherein the computer means receives and processes input information from the first, second, third, fourth, fifth and sixth electronic signals and the computer means processes the received information to determine when a collision is imminent;

wherein the computer means includes means for processing the second and the third electronic signals from at least two of the laser radar sets to determine the direction of movement and the speed of the obstacle relative to the vehicle and thereby to generate seventh electronic signals representing the direction of movement of the obstacle, and eighth electronic signals representing the relative speed of the obstacle; wherein, by counting the number of laser radar beams being reflected back by the obstacle, the computer means calculates the estimated size of the obstacle and generates ninth electronic signals representing the size of the obstacle; wherein the computer means further includes means for processing the second, third, fourth, fifth, seventh and eighth electronic signals to determine speed and direction of movement of the obstacle relative to the earth and to generate tenth electronic signals representing the speed of the obstacle relative to the earth, and eleventh electronic signals representing the direction of movement of the obstacle relative to the earth.

2. The collision avoidance system of claim 1, further comprising an automatic braking means functionally connected with and actuated by the computer means after a predetermined waiting period of time following the actuation of the alarm means; wherein the automatic braking means is deactivated by the computer means when the computer means detects a change of the fourth electronic signals exceeding a predetermined magnitude after the actuation of the alarm means, and when the computer means detects a change of the fifth electronic signals exceeding a predetermined magnitude within the waiting period.

3. The collision avoidance system of claim 1, wherein the extrinsic condition input means includes a road condition selector, wherein the road condition selector is manually selected by a vehicle user and automatically selected by a branch circuit from a windshield wiper of the vehicle such that the sixth electronic signals include information representing the ongoing road conditions.

4. The collision avoidance system of claim 1, wherein the extrinsic condition input means includes a visibility condition selector, wherein the visibility condition selector is manually operated by a vehicle user and automatically selected by a branch circuit from a headlight of the vehicle such that the sixth electronic signals include information representing the ongoing visibility conditions.

5. The collision avoidance system of claim 1, wherein the extrinsic condition input means includes a driver's condition selector, wherein the driver's condition selector is manually operated by a vehicle user such that the sixth electronic signals include information representing the driver's physical or mental conditions.

6. The collision avoidance system of claim 1, wherein each laser radar set includes a plurality of laser radar units evenly separated angularly and arrayed over an approximately 180 degree span, each laser radar unit being directed at a predetermined direction such that the laser radar set scans an approximately 180 degree semicircular zone, said predetermined direction of each laser radar unit being represented by the third electronic signals provided by each associated angle message means; wherein the computer means receives and processes the second and the third electronic signals to determine the direction of location of the detected obstacle.

7. The collision avoidance system of claim 1, wherein each laser radar set includes at least one laser radar unit mounted on a rotatable structure, said rotatable structure being functionally controlled and rotated by a motor such that the laser radar unit scans an approximately 180 degree zone; wherein the laser radar unit emits and receives laser radar beams at predetermined emitting angles and at detectable emitting angles; wherein the predetermined emitting angles are represented by the third electronic signals provided by the associated angle message means; and wherein the laser radar unit emits at detectable emitting angles, and the angle message means includes an angle sensor, said detectable emitting angles being detected by the angle sensor, said detectable emitting angles being represented by the third electronic signals generated by the angle sensor thereof.

8. The collision avoidance system of claim 1, wherein the computer means further includes means to process the information received from the electronic signals for predicting the vehicle's locations and courses of movement and the obstacle's locations and courses of movement to determine a predicted collision time if both the vehicle and the obstacle continue to move at their respective current speeds and directions; wherein the computer means further includes means to process the electronic signals to determine a minimal allowable time, by utilizing a predetermined multivariable function for calculation, and by selectively reading a plurality of pre-stored memory matrices each storing information of minimal allowable time for a particular set of input variables.

9. The collision avoidance system of claim 8, wherein the variables of the multi-variable function and the memory matrices are selected from a group consisting of the direction of movement of the vehicle relative to the earth, the vehicle's speed relative to the earth, the extrinsic conditions, the obstacle's size, the speed of the obstacle relative to the earth, the direction of movement of the obstacle relative to the earth, and combinations of these variables.

10. The collision avoidance system of claim 8, wherein the computer means further includes comparison means for comparing the predicted collision time with the minimal allowable time to determine when a collision is imminent; wherein the computer means generates commanding signals in accordance with the comparison results from the comparison means; wherein the commanding signals are sent to the alarm means for actuating an alarm corresponding to the commanding signals.

11. The collision avoidance system of claim 1, further comprising an averaging means, functionally connected with the computer means, for receiving the electronic signals from the steering wheel rotation sensor means and signals from an odometer device, a timer, and the speed sensor means; wherein the averaging means determines an average steering wheel rotation over a predetermined distance and duration of vehicle traveling preceding the determination; wherein the averaging means generates correction factor signals if the average steering wheel rotation deviates from zero; wherein the computer means receives and processes the correction factor signals to supplement the first, second, third, fourth and fifth electronic signals in determining imminency of a collision.

12. The collision avoidance system of claim 1, further including a laser gyroscope means mounted on the vehicle for detecting directional change rate of the vehicle; wherein the laser gyroscope means further includes means to process the information of the vehicle directional change rate to determine the vehicle's direction of movement and to generate twelfth electronic signals representing the vehicle's direction of movement; wherein the computer means receives and processes the information from the first, second, third, fifth, sixth and twelfth electronic signals to determine when a collision is imminent.

13. The collision avoidance system of claim 1, further comprising a vehicle tilting sensor means for detecting tilting of the vehicle body and generating vehicle tilting signals; wherein the computer means receives and processes the vehicle tilting signals to supplement the first, second, third, fourth and fifth electronic signals in determining imminency of a collision.

14. The collision avoidance system of claim 1, further including an automatic braking means for braking the vehicle functionally connected with and actuated by the computer means after a predetermined waiting period of time following the determination by the computer means that a collision is imminent; wherein the automatic braking means is deactivated by the computer means when the computer means determines that imminent collision does not exist; wherein the automatic braking means includes an electric pump functionally connected with a hydraulic system of the vehicle's brake system to adjust the pressure in the hydraulic system to brake the vehicle upon actuation of the automatic braking means.

15. A wheel skidding detecting system for a roadway vehicle comprising:

a laser gyroscope means horizontally mounted on the vehicle for detecting any horizontal directional change rate of the vehicle and for generating a first electronic signal for the actual directional change rate of the vehicle;

a speed sensor means functionally connected with a speedometer for generating a second electronic signal for the vehicle's speed;

a steering wheel rotation sensor means functionally connected with a steering wheel of the vehicle for detecting rotation information of the steering wheel and generating a third electronic signal representing the steering wheel rotation information;

a computer means for receiving information of the first, second and third electronic signals, wherein the computer means includes means to process the second and the third electronic signals to determine a predicted directional change rate of the vehicle; the computer means further including means to calculate a discrepancy between the actual directional change rate and the predicted directional change rate and to determine the presence of wheel skidding based on the magnitude of the discrepancy exceeding a predetermined amount, with the magnitude, positivity or negativity of the discrepancy being correlated with the severity and direction of the wheel skidding; and the computer means further including means to generate electronic output signals for the presence, magnitude and direction of wheel skidding; and a vehicle control means for receiving the electronic output signals for the presence, magnitude and direction of wheel skidding, wherein the vehicle control means includes means to respond to the electronic output signals.

16. The wheel skidding detecting system of claim 15, further comprising a vehicle tilting sensor means for detecting tilting of the vehicle's body and generating a fourth electronic signal; wherein the computer means receives and processes the second, the third, and the fourth electronic signals to determine the predicted directional change rate of the vehicle.

17. The wheel skidding detecting system of claim 15, wherein the vehicle includes rear wheel steering capability, and the vehicle control means includes at least a rear wheel steering angle adjusting means for adjusting the steered angle of rear wheels to control the wheel skidding.

18. The wheel skidding detecting system of claim 15, wherein the vehicle control means includes a vehicle engine deceleration means for automatically decelerating the vehicle engine to control the wheel skidding.

19. The wheel skidding detecting system of claim 15, wherein the vehicle control means includes a vehicle transmission adjusting means for automatically adjusting the transmission to lower gears to control the wheel skidding; and a driveline adjusting means for automatically adjusting the driveline into all wheel drive mode to control the wheel skidding.

20. The wheel skidding detecting system of claim 15, further comprising an averaging means functionally connected with the computer means for receiving the electronic signals from the steering wheel rotation sensor means, electronic signals from the steering wheel rotation sensor means, electronic signals from an odometer device, a timer device, and the speed sensor means; wherein the averaging means determines an average steering wheel rotation over a predetermined distance and a predetermined duration of vehicle travel preceding the determination; wherein the averaging means generates a correction factor signal if the average steering wheel rotation deviates from zero; wherein the computer means receives and processes the correction factor signal to supplement the second and the third electronic signals in determining the predicted directional change rate of the vehicle.

21. A collision avoidance system for a vehicle, comprising:

at least two laser radar sets being separately mounted on the vehicle, each laser radar set including at least a laser radar unit, each laser radar unit including a transmitter means for transmitting laser radar signals and a receiver means for receiving laser radar signals reflected by an obstacle from the transmitted laser radar signals and for generating first electronic signals thereof;

an angle message means associated with each laser radar unit for providing second electronic signals representing one of emitting direction and receiving direction of each associated laser radar unit;

a steered direction sensing means for sensing direction of movement of the vehicle and generating third electronic signals thereof;

a speed sensing means for sensing speed of the vehicle and generating fourth electronic signals thereof;

a computer means for receiving and processing the first, the second, the third and the fourth electronic signals; wherein the computer means processes the first electronic signals from each laser radar unit to determine distance and radial component of relative speed between the obstacle and the laser radar unit and generates fifth electronic signals thereof; wherein the computer means processes the second and the fifth electronic signals and, based on any discrepancy of the second and the fifth electronic signals between different laser radar units, the computer determines direction of movement and speed of the obstacle relative to the vehicle and generates sixth electronic signals thereof; wherein the computer means further processes the second, the third, the fourth, the fifth and the sixth electronic signals to determine an imminent collision between the vehicle and the obstacle and generates electronic signals thereof; and response means connected with the computer means for producing a reaction upon receipt of the imminent collision signals from the computer means.

22. The collision avoidance system of claim 21, wherein the computer means processes the first and the second electronic signals to obtain distance and angular dimension of the obstacle and thereby estimates the size of the obstacle and generates electronic signals representing the size of the obstacle; and the computer means further processes signals representing obstacle size for the determination of the imminent collision.

23. The collision avoidance system of claim 21, further comprising an extrinsic condition input means for generating electronic signals representing at least an extrinsic condition parameter; wherein the computer means further receives and processes the electronic signals from the extrinsic condition input means to modify the determination of the imminent collision.

24. The collision avoidance system of claim 21, wherein the computer means utilizes the signals for the direction of movement and the speed of the obstacle relative to the vehicle, the signals for the speed of the vehicle and the signals for the direction of movement of the vehicle to calculate speed and direction of movement of the obstacle relative to the earth, and thereby calculates predicted location and direction of movement of the obstacle if the obstacle continues to move at the current speed and direction; wherein the computer means further calculates predicted location and direction of movement of the vehicle if the vehicle continues to move at the current speed and direction; and thereby the computer means calculates predicted collision time if both the obstacle and the vehicle continue to move at their respective current speeds and direction.

25. The collision avoidance system of claim 24, wherein the computer means utilizes a predetermined multi-variable function to determine minimal allowable time; wherein the computer means further includes comparison means for comparing the predicted collision time with the minimal allowable time for determination of imminent collision.

26. The collision avoidance system of claim 24, wherein the computer means selectively reads a plurality of pre-stored memory matrices, each matrix storing information of minimal allowable time for a particular set of variables; wherein the computer means further includes comparison means for comparing the predicted collision time with the minimal allowable time for determination of imminent collision.

27. The collision avoidance system of claim 25, wherein variables of the multi-variable function include at least one of the direction of movement of the vehicle, the speed of the vehicle, an extrinsic condition parameter, an estimated size of the obstacle, the speed of the obstacle relative to the earth, and the direction of movement of the obstacle relative to the earth.

28. The collision avoidance system of claim 26, wherein the variables of the memory matrices include at least one of the direction of movement of the vehicle, the speed of the vehicle, and extrinsic condition parameter, an estimated size of the obstacle, the speed of the obstacle relative to the earth, and the direction of movement of the obstacle relative to the earth.

29. The collision avoidance system of claim 21, wherein the imminent collision signals include signals for a plurality of stages of imminency, and the reaction generated by the response means includes a plurality of levels of reaction correlated with the stages of imminency.

30. The collision avoidance system of claim 21, wherein at least two laser radar sets are equipped on at least one of the vehicle's four sides, including a front side, a rear side, a left side and a right side; wherein on each equipped side at least one laser radar set is mounted near one end of the equipped side and at least another laser radar set is mounted near the other end of the equipped side.

31. The collision avoidance system of claim 21, wherein the steered direction sensing means includes a steering wheel rotation sensor means for sensing steering wheel rotation and generating electronic signals thereof representing the direction of movement of the vehicle.

32. The collision avoidance system of claim 21, wherein the steered direction sensing means includes a laser gyroscope means for sensing directional change of the vehicle and generating electronic signals thereof representing the direction of movement of the vehicle.

33. The collision avoidance system of claim 21, further comprising a vehicle tilting sensor means for detecting tilting of vehicle body and generating electronic signals thereof; wherein the computer means further receives and processes the signals from the vehicle tilting sensor means to modify the determination of imminent collision.

34. The collision avoidance system of claim 21, wherein the response means includes an alarm device and the reaction includes an alarm, said alarm device producing the alarm upon receipt of the imminent collision signals from the computer means.

35. The collision avoidance system of claim 21, wherein the response means includes an automatic braking means and the reaction includes actuation of the automatic braking means, said automatic braking means being actuated to brake the vehicle upon receipt of the imminent collision signals from the computer means.

36. The collision avoidance system of claim 23, wherein the extrinsic condition input means includes one of a manually selectable road condition selector and an automatically selectable road condition selector, the automatically selectable road condition selector being controlled by a branch circuit from a windshield wiper of the vehicle.

37. The collision avoidance system of claim 23, wherein the extrinsic condition input means includes one of a manually selectable visibility condition selector and an automatically selectable visibility condition selector, the automatically selectable visibility condition selector being controlled by a branch circuit from a headlight of the vehicle.

38. The collision avoidance system of claim 23, wherein the extrinsic condition input means includes a driver's condition selector manually selectable by a vehicle driver to represent the driver's physical and mental conditions.

39. The collision avoidance system of claim 21, wherein each laser radar set includes a plurality of laser radar units evenly separated angularly and arrayed over a generally 180 degree span.

40. The collision avoidance system of claim 21, wherein each laser radar set includes at least one laser radar unit mounted on a rotatable structure such that the laser radar unit is rotated through a pre-determined angular span.

41. The collision avoidance system of claim 31, further comprising a traveling distance detecting means for providing signals representing distance of vehicle traveling, and an averaging means for receiving and processing the signals from the steering wheel rotation sensor means and the signals from the traveling distance detecting means; wherein the averaging means determines average steering wheel rotation over a pre-determined distance of vehicle traveling and generates correction factor signals representing deviation of the average steering wheel rotation front zero; wherein the computer means further receives and processes the correction factor signals to modify the signals from the steering wheel rotation sensor means.

42. A wheel skidding detecting system for a roadway vehicle, comprising:

a laser gyroscope means mounted on the vehicle for detecting directional change rate of the vehicle and generating first electronic signals thereof representing actual directional change rate of the vehicle;

a speed sensor means for sensing speed of the vehicle and generating second electronic signals thereof;

a steering wheel rotation sensor means for sensing steering wheel rotation and generating third electronic signals thereof;

a computer means for receiving and processing the second and the third electronic signals to determine a predicted directional change rate of the vehicle; wherein the computer means further receives and processes the first electronic signals to calculate a discrepancy between the actual directional change rate and the predicted directional change rate, and thereby determines presence of wheel skidding based on the magnitude of the discrepancy exceeding a predetermined amount, with the magnitude, positivity or negativity of the discrepancy being correlated with severity and direction of the wheel skidding; wherein the computer means generates output signals representing the presence, magnitude and direction of wheel skidding thereof; and vehicle control means for receiving the output signals from the computer means and generating a response to alleviate the wheel skidding.

43. The wheel skidding detecting system of claim 42, further comprising a vehicle tilting sensor means for detecting tilting of the vehicle and generating electronic signals representing vehicle tilting; wherein the computer means further receives and processes the vehicle tilting signals to determine the predicted directional change rate of the vehicle.

44. The wheel skidding detecting system of claim 42, wherein the vehicle is one of a four-wheel steering vehicle and a vehicle with rear wheel steering capability; wherein the vehicle control means includes at least a rear wheel steering angle adjusting means for adjusting rear wheel steering to alleviate the wheel skidding.

45. The wheel skidding detecting system of claim 42, wherein the vehicle control means includes at least one of a vehicle engine deceleration means for decelerating the vehicle engine upon receipt of the output signals from the computer means, and a vehicle transmission adjusting means for adjusting the transmission to lower gears upon receipt of the output signals from the computer means.

46. The wheel skidding detecting system of claim 42, wherein the vehicle includes two-wheel drive and four-wheel drive dual mode capability; wherein the vehicle control means includes a driveline adjusting means for adjusting the driveline into the four-wheel drive mode upon receipt of the output signals from the computer means.

47. The wheel skidding detecting system of claim 42, further comprising a traveling distance detecting means for providing signals representing distance of vehicle traveling; and an averaging means for receiving and processing the signals from the steering wheel rotation sensor means and the signals from the traveling distance detecting means for determining an average steering wheel rotation over a predetermined distance of vehicle traveling and generating correction factor signals representing deviation of the average steering wheel rotation from zero; wherein the computer means further receives and processes the correction factor signals to determine the predicted directional change rate of the vehicle.

* * * * *